United States Patent [19]

Hawk

[11] 4,445,953
[45] May 1, 1984

[54] METHOD OF FORMING SHAPED LAMINATES

[75] Inventor: Thomas W. Hawk, New Kensington, Pa.

[73] Assignee: PPG Industries, Inc., Pittsburgh, Pa.

[21] Appl. No.: 352,423

[22] Filed: Feb. 25, 1982

[51] Int. Cl.$^3$ .................... B32B 17/00; B32B 31/00; B29C 17/04; C03B 21/00

[52] U.S. Cl. ................................. 156/102; 156/103; 156/214; 156/224; 428/426; 65/63; 264/549

[58] Field of Search ............. 156/286, 104, 102, 269, 156/212, 222, 214, 220, 224, 103, 105, 229; 65/106, 64, 107, 76, 63, 54; 428/426, 412, 423.1, 425.5, 447, 437, 428; 264/532, 549, 289.3

[56] References Cited

U.S. PATENT DOCUMENTS

| | | | |
|---|---|---|---|
| 2,306,314 | 12/1942 | Lardin | 156/103 |
| 3,004,295 | 10/1961 | Bottoms et al. | 18/56 |
| 3,020,596 | 2/1962 | Clapp et al. | 18/56 |
| 3,123,459 | 3/1964 | Hens | 65/106 |
| 3,414,395 | 12/1968 | Reese et al. | 65/107 |
| 3,558,408 | 1/1971 | Hamilton | 156/222 |
| 3,560,183 | 2/1971 | Stilley et al. | 65/107 |
| 3,607,188 | 9/1971 | Stilley et al. | 65/106 |
| 3,616,197 | 10/1971 | Amberg | 156/224 |
| 3,769,133 | 10/1973 | Halberschmidt et al. | 156/286 |
| 3,808,077 | 4/1974 | Rieser et al. | 156/102 |
| 4,174,241 | 11/1979 | Rockar et al. | 156/102 |
| 4,176,154 | 11/1979 | Miki et al. | 264/549 |
| 4,180,426 | 12/1979 | Oustin et al. | 156/104 |
| 4,252,552 | 2/1981 | Frank | 65/107 |
| 4,368,087 | 1/1983 | Valimont et al. | 156/102 |

Primary Examiner—Edward C. Kimlin
Assistant Examiner—Louis Falasco
Attorney, Agent, or Firm—Edward I. Mates

[57] ABSTRACT

Lightweight aircraft transparencies are shaped to a desired configuration by laying up a plurality of flat oversized plastic sheets in a desired sequence to form a flat assembly. Portions of the marginal edges of the flat assembly are supported on a female support ring having a non-planar supporting surface. The assembly is first shaped at a temperature below its deformation temperature to a preliminary shape where its marginal edge portions conform to the non-planar supporting surface of the female support ring. While the marginal edges of the preliminarily shaped assembly are maintained in conformity with the female support ring, the assembly is uniformly exposed in an enclosed autoclave to elevated pressures to minimize outgassing and to elevated temperatures above its deformation temperature. A male form having an outline smaller than the female support ring engages the central portion of the preliminarily shaped assembly to impress the desired final shape thereto, e.g., a compound configuration. Thereafter, the marginal edge portions of the finally shaped and laminated assembly are trimmed away to leave the central portion of the assembly with a desired shape.

12 Claims, 11 Drawing Figures

METHOD OF FORMING SHAPED LAMINATES

FIELD OF THE INVENTION

This invention relates to the formation of laminates, and more particularly, to the formation of lightweight aircraft transparencies.

BACKGROUND OF THE INVENTION

Lightweight aircraft transparencies have been formed by laminating together a plurality of thin plastic sheets. Commonly, a transparency is formed of a desired number of relatively rigid plastic sheets of requisite curvature interspaced by relatively soft plastic interlayer sheets. Because the optical quality required of such a transparency is high and because the plastic sheets are relatively susceptible to damage, specialized fabrication procedures have developed.

In one such fabrication procedure, the desired number of rigid sheets or "lites", e.g., two to four, are cut from 4 foot×4 foot (1.3 meter×1.3 meter) blanks of plastic sheeting to a size slightly greater than the desired final size of the transparency to be formed. Each of the lites are then individually formed to a preliminary contour by slumping each individual lite to conform to a shaped plate. This is followed by pressing each individual lite between glass pressing plates at elevated temperature and pressure. An appropriate number of the relatively soft plastic interlayer sheets, such as polyurethane and/or plasticized polyvinyl butyral, are then cut to size and pre-stretched to the preliminary contour of the lites. The lites and interlayer sheets are then laid up in their desired sequence and positioned as an assembly between a pair of glass pressing plates having surfaces covered with a release agent. The entire system is then inserted into an autoclave where lamination and forming to the final shape is accomplished. Thereafter, the laminate is cooled, removed from the autoclave, released from the pressing plates, and trimmed to its desired final configuration.

Although useful for particular simple contours of aircraft transparencies, the preceding procedure involves several limitations which would preferably be avoided. For example, each of the lites and interlayer sheets must be individually cut to a preliminary size and then individually formed to a preliminary contour between glass pressing plates. These operations involve substantial manual labor and time. Further, it may be difficult to succeed in forming each lite to a preliminary contour which is sufficiently similar to each of the other lites to minimize the development of thickness non-uniformities in the interlayer sheets laminated therebetween when the assembly of lites and interlayer sheets is subjected to a laminating temperature that causes the interlayer sheets to flow and compensate somewhat for the dissimilarities in contour of adjacent lites in the assembly. Additionally, the final contour of laminates formed by the preceding procedure is limited to the contour attainable in the pressing plates used to impress the final contour. While this limitation does not cause a problem when forming relatively simple contours, it poses considerable difficulty when relatively complex contours are desired, e.g., compound contours, because optically smooth, compound-contoured glass pressing plates are not readily fabricated. Thus, it can be appreciated that a need exists for a more advantageous method of fabricating a curved laminate, particularly one having a complicated shape.

DESCRIPTION OF PATENTS OF INTEREST

U.S. Pat. No. 3,004,295 to Bottoms et al discloses shaping laminates of transparent plastic materials such as polyester plastics and crosslinked acrylic plastics into a female die form by a combination of steps. One step involving vacuum drawing a blank to be shaped against an upper die face is combined with a step of applying pressure to the side edges of the blank in directions approximately perpendicular to the planes of said side edges. The application of edge pressure helps move the blank into closer conformity with the upper die face to improve the efficiency of the vacuum drawing.

U.S. Pat. No. 3,020,596 to Clapp et al discloses the forming of an aircraft canopy to a final contour by differential pressure against the opposite major surfaces of a sheet that has been formed to an intermediate shape during a stretch forming operation.

U.S. Pat. No. 3,123,459 to Hens shapes a heat-softened glass sheet by engaging its marginal areas only between a pair of shaping frames of complementary curvature followed by or simultaneously with urging a resilient pad against one of the major surfaces within the engaged marginal areas to develop a compound shape in the glass sheet.

U.S. Pat. No. 3,414,395 to Reese et al shapes a glass sheet to a hemispherical shape by a combination of applying a downward mechanical force against the upper surface of a heat-softened glass sheet supported in a horizontal plane over a ring-type flange extending upward and outward from a hemispherical mold to develop a partial shape in the supported glass sheet followed by continuing to heat the partially shaped sheet to complete the bend by sagging the latter toward the shaping surface of the mold. The mold may be apertured for the application of suction to help conform the sagged sheet to the mold shaping surface.

U.S. Pat. No. 3,560,183 to Stilley et al discloses another method and apparatus for forming a glass sheet into a hemispherical shape that includes a mold of hemispherical shape. On this apparatus, a ring for supporting a flat glass sheet to be formed surrounds the mold and has a high coefficient of thermal expansion so that, when the glass sheet and ring are heated, the glass sheet falls within the ring and onto an oblique ledge that surrounds the mold. The glass sheet slides down the oblique ledge and into the hemispherical mold.

U.S. Pat. No. 3,607,188 to Stilley et al discloses another method and apparatus for shaping a glass sheet to a hemispherical shape. The apparatus comprises a ring support that supports a flat glass sheet to be shaped, a plunger smaller than the ring support so that it can move from above to below the ring support to extrude the glass sheet into a spherical shape and a receiving surface below the ring to receive the shaped glass sheet.

The four previous patents all treat a single glass sheet. None of them mention shaping either one or an assembly of sheets of plastic material.

U.S. Pat. No. 3,769,133 to Halberschmidt et al discloses laminating a glass-plastic assembly comprising alternate layers of glass and plastic by inserting the assembly within an envelope having at least one flexible wall and at least one open side edge. The assembly and envelope are inserted within an autoclave and subjected to reduced pressure to degas the assembly. The envelope is sealed and the sealed envelope and its contents are then subjected to elevated heat and pressure to complete the lamination.

U.S. Pat. No. 3,808,077 to Rieser et al simultaneously press polishes and laminates a sheet of transparent plastic to a shaped sheet of glass. A glass mold with a parting material facing the sheet of plastic is used for the simultaneous press polishing and laminating operation and can be removed from the desired laminate when the latter is to be installed.

U.S. Pat. No. 4,174,241 to Rockar et al discloses a method of simultaneously laminating and press polishing a plastic assembly to form a laminated transparency. The components of the assembly are sandwiched between a pair of pressing plates larger in outline than the transparency. Compressible wedges separate the pressing plates by a distance greater than the total thickness of the components. The pressing plates pivot toward one another to help expel fluid from the interfaces of the assembly as the assembly is subjected to elevated heat and pressure while said assembly is sandwiched between said pressing plates within an evacuated bag.

U.S. Pat. No. 4,180,426 to Oustin discloses a method of making laminated windows. The components of the window are assembled within a porous cover. The cover and the components are placed within a flexible bag. The latter is placed inside an evacuable container. Pressure is reduced to subatmospheric levels in both the bag and the container so that the container is initially at a lower pressure than the bag. Then, the temperature and pressure within the container are increased while maintaining subatmospheric pressure in the bag to seal the edges of the assembly and later are further increased over atmospheric pressure to bond the components of the assembly into a laminated window.

SUMMARY OF THE INVENTION

The present invention provides a method of fabricating a laminate having a desired contour, e.g., a compound or complicated contour, including the steps of supporting a plurality of relatively flat sheets in an overlying relation one to another to form an assembly; evacuating gases from the interfacial surfaces of the sheets; laminating the overlying sheets together; positioning peripheral edge portions of the assembly in facing relation to portions of a non-planar supporting surface of a female support ring; biasing the assembly by engaging it with a male form against the outer major surface of said assembly facing away from said skeleton ring at a first temperature below its deformation temperature toward the supporting surface of the female skeleton ring to conform the marginal edge portion of a first major surface of the assembly to a preliminary shape conforming to the supporting surface of the female support ring; heating the assembly to a second temperature equal to or greater than its deformation temperature while the male form is separated from the assembly to expose the assembly to superatmospheric pressure sufficient to prevent outgassing from the sheets; and reengaging the male form against a central unsupported portion of the opposite major surface of the peripherally supported assembly to impress the desired contour on the central portion of the assembly while the assembly is heated and exposed to pressure. In this manner, lites of the final laminate need not be individually pre-shaped in advance of laminating, because the lites are all shaped simultaneously by the same instrumentality to minimize optical irregularities due to non-uniform shape of the lites and/or non-uniformities in thickness of the interlayers in the laminate. Moreover, complicated contours of complex and/or compound configuration may be conveniently fabricated because glass pressing plates are not necessary in the practice of the invention.

In a preferred embodiment of the invention, the female support ring has a contour corresponding to an extension of the final desired contour of the laminate, and the male form, smaller in outline than the female support ring, has a shaping surface which defines the final desired contour. After preliminarily shaping the assembly to the female support ring at a temperature below the deformation temperature of the lites, the assembly so formed is clamped to the female support ring to maintain the shape of its peripheral edge portion against the female support ring, the male form is separated from the upper major surface of the assembly, the assembly and the separated male form are introduced into an autoclave where rapidly increasing pressure and less rapidly rising temperature are applied to the assembly. The shaping surface of the male form is advanced through the female support ring to impress the complicated configuration of the male form onto the assembly to develop a final, complicated configuration desired in the assembly while the assembly and male form are in the autoclave at elevated pressure and temperature. Thereafter, the laminate that results is removed from the autoclave and the supported marginal edge portions of the laminate may be cut away to leave the central portion having the desired contour and configuration.

Since the male form used with the present invention is an exact copy of a master tool provided to establish the desired configuration, all laminates produced by apparatus conforming to the present invention have identical configuration. Such identity of configuration was impossible using the prior art technique described previously, particularly when glass sheet pressing plates were used to develop complex or compound configurations in the lites to be laminated.

DESCRIPTION OF THE DRAWINGS

In the drawings that form part of a description of illustrative embodiments of this invention and where like reference numbers refer to like structural elements.

DESCRIPTION OF THE INVENTION

Figure 1:
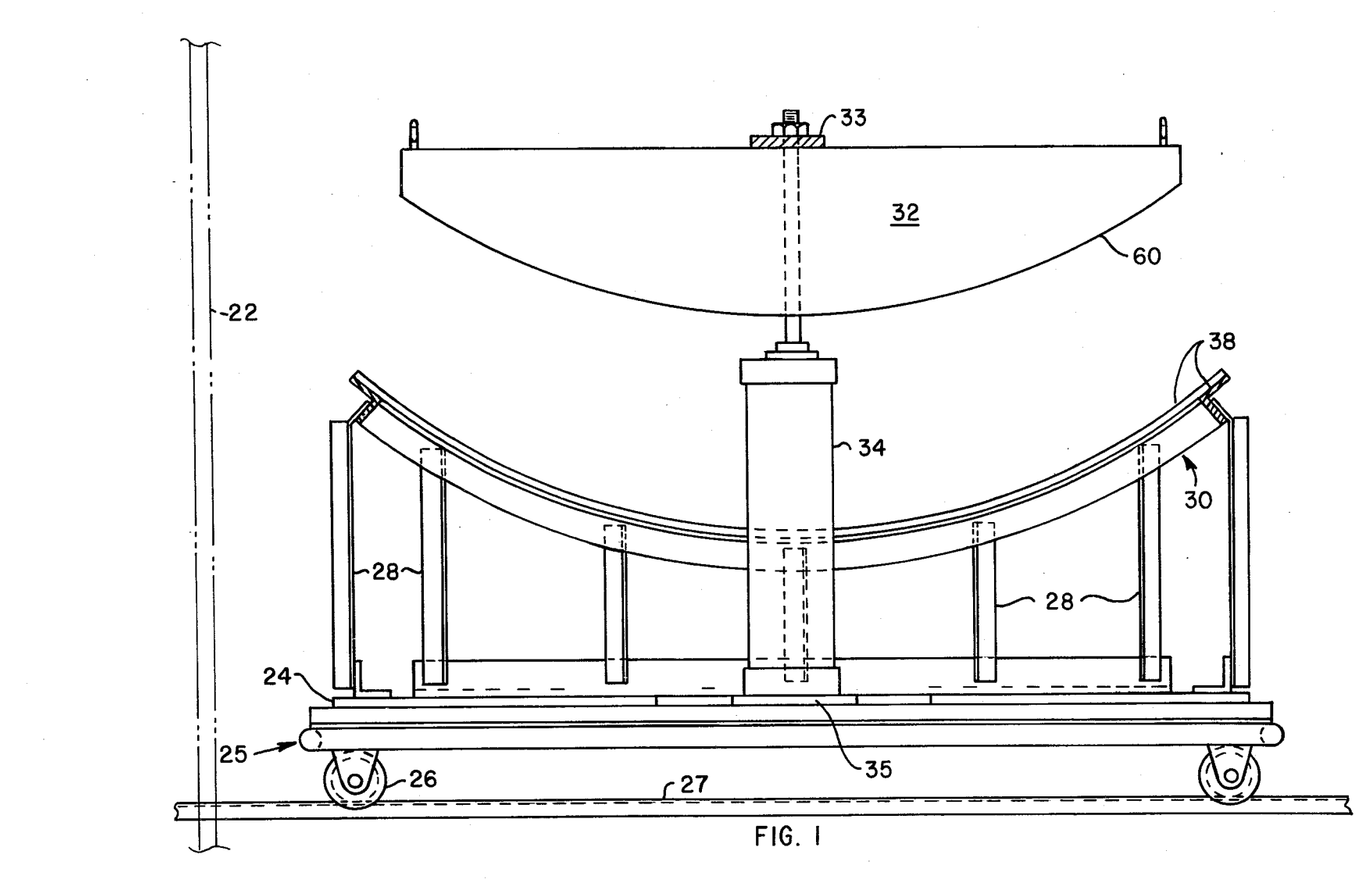
FIG. 1 is an elevated sectional view of apparatus useful in shaping assemblies in accordance with the present invention, positioned in a preliminary orientation.
Figure 2:
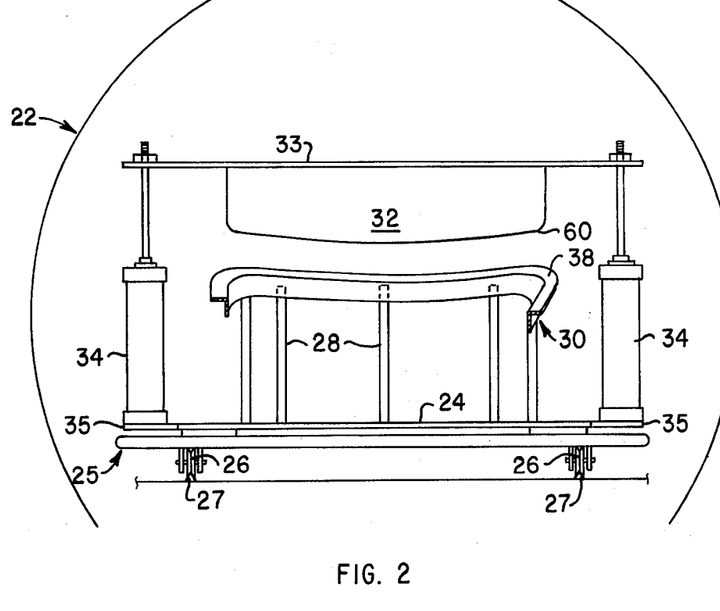
FIG. 2 is a sectional view taken at right angles to the view of FIG. 1.
Figure 3:
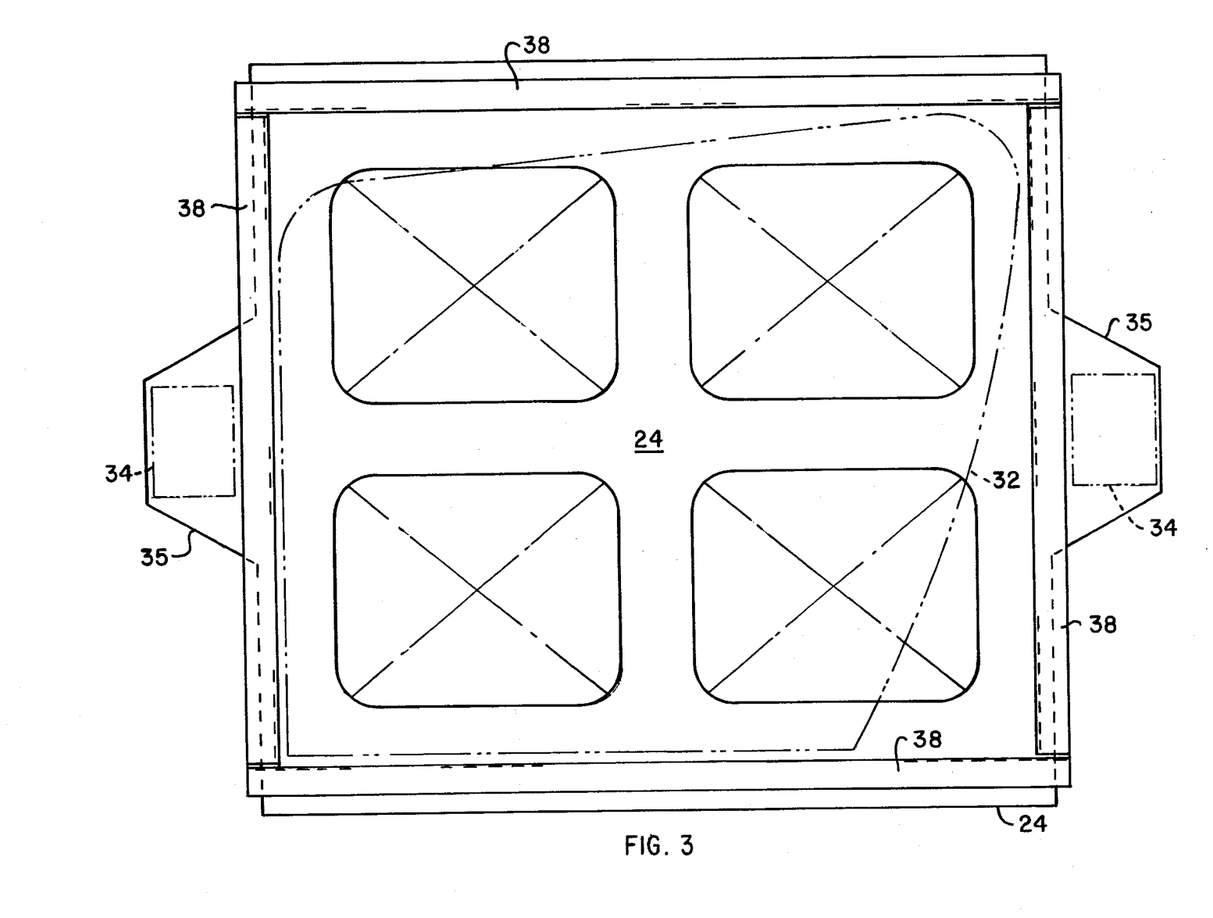
FIG. 3 is a plan view of a female support ring forming part of the apparatus of FIG. 1 with the outline of a male form that cooperates with the female support ring shown in phantom to indicate the relation of the male form outline with the inner perimeter of the female support ring.
Figure 8:
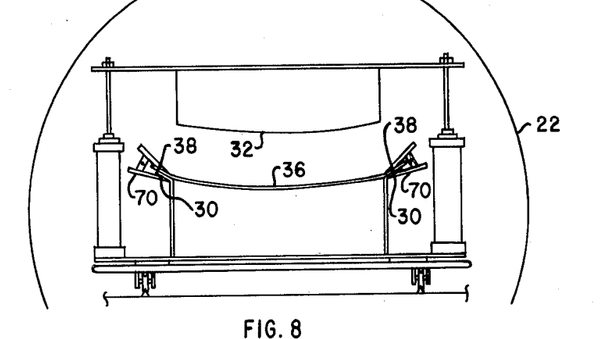
FIG. 8 is a schematic elevational view similar to FIGS. 5, 6 and 7, showing the arrangement of a male form and a female support ring within an autoclave during autoclave heating and pressurizing steps in the practice of the present invention.
Figure 9:
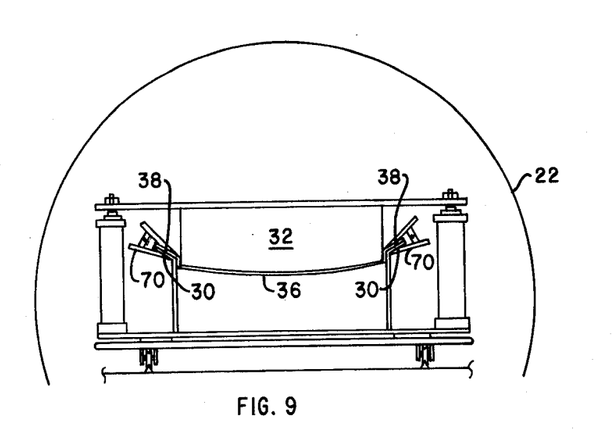
FIG. 9 is a schematic elevational view similar to FIG. 8 taken after the autoclave heating and pressurizing step of FIG. 8 is completed, when an urging step develops a final shape in the laminate.

FIGS. 1-3 show a shaping apparatus 20 adapted to be positioned within an air autoclave 22 (FIGS. 2, 8 and 9). The shaping apparatus 20 includes a base plate 24 which is conveniently adapted for support by a carriage 25 provided with wheels 26 mounted on tracks 27 that extend from the autoclave. A plurality of upright support braces 28 connect the base plate 24 to a generally horizontally supported female support ring 30.

A male form 32 comprising a downwardly facing portion composed of a readily formed material capable of withstanding exposure to temperatures required to shape polycarbonate or acrylic plastic, such as fiber glass reinforced epoxy, is supported from a metal plate 33 and is movably mounted for vertical movement relative to the female support ring 30 by a pair of vertically extending air cylinders 34 supported by plates 35.

Figure 4:
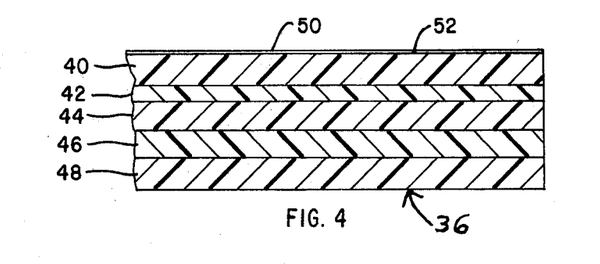
FIG. 4 is an enlarged sectional view of an edge portion of an assembly to be formed.
Figure 5:
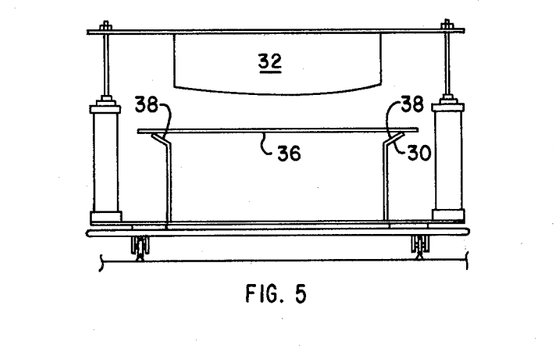
FIG. 5 is a schematic elevational view of the apparatus of FIG. 1 showing how an assembly is mounted relative to the apparatus to begin a shaping operation.

A generally flat assembly 36 is shown in FIG. 5 supported along portions of its marginal edges by an upwardly facing, supporting surface 38 extending obliquely outward and upward around the peripheral portion of the female support ring 30. Referring to FIG. 4, the assembly 36 may include a plurality of relatively rigid plastic sheets (or lites) interspaced by an appropriate number of relatively soft plastic sheets (or interlayers). The specific assembly 36 shown in FIG. 4 includes an upper lite 40, an interlayer 42, an intermediate lite 44, an interlayer 46, and a lower lite 48. The materials and thicknesses utilized for the lites 40, 44 and 48, and the interlayers 42 and 46 depend upon the specifications required to be met for a particular aircraft transparency. Common materials selected for use as lites 40, 44 and 48 include polycarbonate and acrylic, such as polymethyl methacrylate (both as-cast and stretched), in thicknesses ranging from approximately 0.125 inch (0.3 centimeters) to approximately 0.750 inch (1.9 centimeters). Common materials selected for use as interlayers 42 and 46 include polyurethanes and plasticized polyvinyl butyral in thicknesses ranging from approximately 0 .015 (0.04 centimeter) to approximately 0.120 inch (0.3 centimeter). In addition to the indicated layers 40, 42, 44, 46 and 48, the assembly 36 may include thin primer layers between the inboard surfaces of layers 40, 42, 44, 46 and 48 to improve adhesion therebetween. Primer materials useful for such purposes include polyurethane dissolved in a methylene chloride-cyclohexanone solvent or in chloroform.

Prior to the present invention, it was common in the fabrication of shaped laminates to individually cut each lite to a desired configuration from a standard sized, 48 inch×48 inch (1.2 meter×1.2 meter) blank of plastic sheet material. Each lite was then individually preshaped to an intermediate contour before being laid up together into an assembly for laminating and final shaping.

In the practice of the present invention, the assembly 36 is initially formed of flat, standard sized blanks of the selected plastic sheet material, thus eliminating the need to cut and shape each lite individually. The flat, standard sized lites 40, 44 and 48 are conveniently laid up with flat interlayers 42 and 46, and in one embodiment of the invention, are thereafter laminated together, in the flat, by conventional techniques. For example, the flat assembly 36 may be placed between flat tempered glass pressing plates, and the resulting sandwich enclosed within an evacuatable bag, preferably of the type described in U.S. Pat. No. 3,255,567 to Leroy D. Keslar and John S. Rankin. The bag may be evacuated to withdraw gases from between the layers 40–48, and then be placed within an autoclave to be exposed to elevated temperatures and pressures to bond the layers 40, 42, 44, 46 and 48 together. The bonded laminate assembly 36 may then be removed from the bag for subsequent shaping according to the present invention.

FIG. 4 also shows a protective layer 50 on the outboard surface 52 of the lite 40 to protect the surface 52 from damage to its optical quality during subsequent shaping steps. The layer 50 may be formed by casting and curing a layer of a silicone resin on the surface 52. In a preferred procedure, an upraised dam is formed about the periphery of the lite 40 and an appropriate quantity of a degassed silicone resin marketed by the Dow Corning Co. under the trademark Sylgard 184 is cast in the liquid state on the surface 52 and cured thereon to form a generally uniform layer having a thickness between approximately 0.030 inch (0.76 centimeter) and approximately 0.060 inch (1.52 centimeters). Thereafter, the flat assembly is positioned on the female support ring 30 as shown in FIG. 1.

As can be best appreciated from FIG. 5, the flat assembly 36 does not engage an endless portion of the female support ring 30 when supported thereon, because the female support ring 30 has an uppermost edge which is contoured in elevation. Preferably, the contour of the female support ring 30 corresponds generally to an extension of the desired contour of the final laminate to be formed within its confines.

Figure 6:
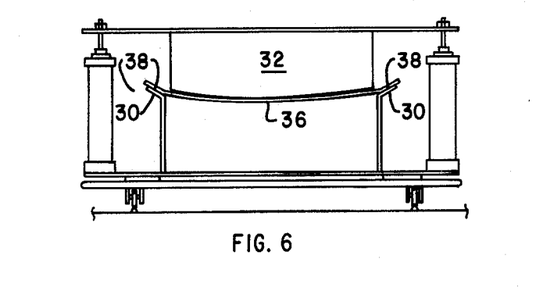
FIG. 6 is a schematic elevational view similar to FIG. 5 taken during a biasing step when the assembly is converted to a preliminarily shaped assembly during an early stage of the invention.

FIG. 6 shows how the assembly 36 is biased at a cold shaping temperature to conform to the contour of the female support ring 30 by actuating the air cylinders 34 to lower the male form 32 into engagement with the central portion of the assembly 36. The male form 32 has peripheral dimensions smaller than the peripheral dimensions of the female support ring 30. The air cylinders 34 bias the male form 32 into engagement with the protective layer 50 over the assembly 36, and continue to bias the male form 32 toward a lower, intermediate position where the marginal edge portions of the assembly 36 develop a preliminary shape that conform to the contour of the female support ring 30. This biasing or preliminary shaping step is preferably practiced below the deformation temperature of the assembly 36, e.g., at ambient temperature, provided that the assembly 36 has sufficient flexibility to conform to the female support ring 30. To further protect the optical quality of the lite 40, the male mold 32 may be covered over its shaping surface with a blanket 60 of compressible, open-cell foam material, such as open cell polyurethane foam.

Figure 7:
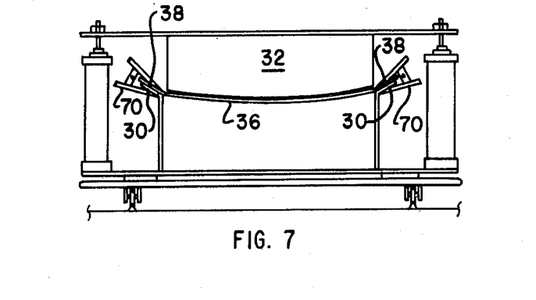
FIG. 7 is a schematic elevational view similar to FIGS. 5 and 6, showing a clamping step that follows the biasing or preliminary shaping step of FIG. 6.

As shown in FIG. 7, the marginal edge portions of the preliminarily shaped assembly 36 are then conveniently clamped to the contoured female support ring 30 while the male form 32 is retained in its lowered, intermediate position. In the absence of clamping, the assembly 36 reverts to its previous flat configuration when the male form is retracted. After clamping, the male form 32 is raised out of engagement with the assembly 36 by the air cylinders 34.

Of course, the invention is not limited to preliminarily shaping the laminate assembly 36 by the use of the male form 32, for alternatively, the laminate assembly 36 may be preliminarily shaped into marginal conformity with the female support ring 30 through the use of other facilities or manually. However, for operational convenience, the male form 32 may be so used, and the preliminary shaping step may be practiced within a chamber such as an air autoclave, prior to the introduction of elevated temperatures and pressures therein.

The preliminarily shaped assembly 36 is then attached to the contoured female support ring 30 by clamps 70 that secure the marginal edge portion of the assembly 36 thereto. With the clamped, preliminarily shaped assembly 36 within the autoclave 22, the male form 32 is lifted out of engagement with the assembly. FIG. 8 shows how the preliminarily shaped and clamped assembly 36 is positioned in the air autoclave 22 relative to the separated male form 32.

Within the autoclave, pressure is raised relatively rapidly and temperature raised less rapidly until the assembly is subjected to elevated temperatures and pressures therein, e.g., 315° F. at 200 pounds per square inch (p.s.i.) (157° C. at 14 kilograms per square centimeter) for a time sufficient to uniformly heat the assembly 36 throughout its thickness. It is preferred to displace the male form 32 out of engagement with the assembly 36 during this heating sequence sufficient distance from the assembly 36 [preferably at least 10 inches (25 centimeters)] in order that it does not act as a heat sink on one surface of the assembly 36. The assembly is heated to a temperature above its deformation temperature to permit its shaping to a final desired complicated contour, e.g., a compound or complex or complex-compound contour. At the same time, the elevated pressure in the air autoclave 22 minimizes or eliminates any outgassing which would normally occur from the interlayers 42 and 46 at such elevated temperatures. Outgassing from the interlayers 42 and 46 is preferably avoided because of the detrimental effect entrapped gas bubbles have on the optical characteristics of the resulting laminated assembly 36. Preferably, the preliminarily shaped and clamped assembly 36 is heated and pressurized in the air autoclave for about 45 minutes at the elevated conditions mentioned previously.

With reference to FIG. 9, after the pressurized assembly 36 is adequately heated to above its deformation temperature, the air cylinders 34 are again actuated to lower the male form 32 into engagement with the central portion of the assembly 36. The male form 32 is urged to advance to a point through and below the level of the female support ring 30 to impress upon the central portion of the assembly 36 the desired complicated contour defined by the shaping surface of the urged male form 32. When the male form 32 has been urged to advance to its pre-set lowermost position to shape the assembly 36 to its desired final shape, a cooling and depressurizing procedure is initiated in the air autoclave 22, while the male form 32 is retained in its lowermost position.

Figure 10:
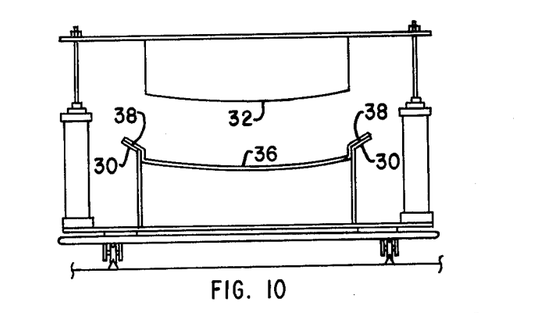
FIG. 10 is a schematic elevational view similar to FIG. 9 taken outside an autoclave after the urging step of FIG. 9 is completed and the male form separated from the resulting shaped laminate.

After the air autoclave 22 has been cooled and depressurized, the shaping apparatus 20 is removed from the autoclave 22. Then, the male form 32 is released from engagement with the assembly 36, and the clamps are released to free the assembly 36, as shown in FIG. 10. If the layers 40, 42, 44, 46 and 48 of the assembly 36 were bonded together in the flat in advance of their positioning on the female support ring 30, the autoclaving and final shaping steps previously discussed serve only to shape the assembly 36 to the final desired contour.

After the assembly 36 is freed from the female support ring 30, the protective layer 50 may be removed. Thereafter, the resulting shaped and laminated assembly 36 may be trimmed about its marginal edge portions to the desired outline configuration, and the central portion that remains after trimming has the desired contour which was impressed upon it by the male form 32. Alternately, the assembly 36 and the protective layer 50 may be trimmed to the outline desired with the protective layer in place during further fabrication, if such is needed. The protective layer may be retained during storage and shipment and removed for installation.

Figure 11:
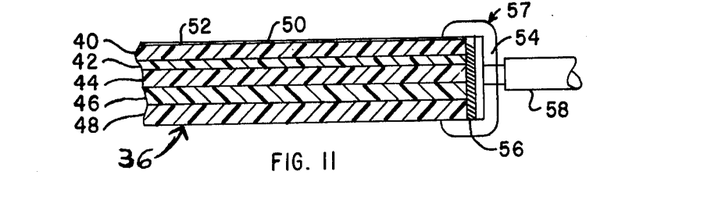
FIG. 11 is a view similar to the view of FIG. 4, showing an alternative embodiment of preparing an assembly to be formed according to the alternate embodiment of the present invention.

FIG. 11 shows an alternative embodiment of the present invention, wherein the layers 40, 42, 44, 46 and 48 of the assembly 36 need not be bonded together in the flat prior to positioning on the female support ring 30. Rather, a peripheral evacuation channel 54 is mounted about the periphery of the flat, unbonded assembly 36 and a vacuum is drawn therein to remove gases from the interfacial surfaces of the assembly 36. The assembly 36 with the peripheral evacuation channel 54 attached is then positioned, in the flat, on the female support ring 30 for subsequent, nearly simultaneous bonding and preliminary shaping. This manner of positioning a peripheral evacuation chamber about an assembly is similar to that taught for a prepressing step in the handling of glass-plastic assemblies described in U.S. Pat. No. 2,948,645 to Laurence A. Keim. When the preliminarily shaped assembly 36 is clamped, unbonded, to the female support ring 30 with the peripheral evacuation channel mounted thereto (as shown in FIG. 11) clamps that clear the evacuation channel must be used. In the final stage of the alternate embodiment, the autoclaving and final shaping steps serve also to simultaneously bond the layers 40-48 together.

A more detailed understanding of the invention may be had by reference to the following specific example.

EXAMPLE I

An assembly 36 conforming to the configuration of FIG. 4 was fabricated in accordance with the present invention. The assembly comprised a lite 40 of a flat 48 inch×48 inch×0.125 inch (122 centimeters×122 centimeters ×0.32 centimeter) sheet of polycarbonate available from Rohm and Haas under the trademark DCM-1 polycarbonate; an interlayer 42 of a 48 inch ×48 inch×0.030 inch (122 centimeters×122 centimeters×0.076 centimeter) polyurethane sheet; a lite 44 of a flat 48 inch×48 inch by 0.125 inch (122 centimeters×122 centimeters×0.32 centimeter) sheet of polycarbonate available from the Rohm and Haas Company under the trademark DCM-1 polycarbonate; an interlayer 46 of 48 inch×48 inch by 0.060 inch (122 centimeters×122 centimeters×0.152 centimeter) polyurethane sheet; and a lite 48 of a flat 48 inch×48 inch by 0.125 inch (122 centimeters×122 centimeters×0.32 centimeter) sheet of as-cast acrylic available from the DuPont Company marketed under the trademark Plexiglass 55 sheet.

Lites 40 and 44 were carefully cleaned and then dried by insertion into a 250° F. (121° C.) oven for about 16 hours to remove moisture. After determining the optical quality of lite 40, it was sometimes necessary to press polish lite 40 between a pair of optically smooth, flat glass pressing plates to improve the optical quality thereof. Lite 48 was cleaned, and just before assembly, was primed on its inboard surface with a suitable primer material, such as a solution of finely divided particles of polyurethane dissolved in chloroform as disclosed in U.S. Pat. No. 4,177,099 to John Radzwill, or dissolved in a methylene chloride-cyclohexanone mixture.

The assembly 36 was next assembled in the desired sequence of layers with the edge portions of the lites 40, 44 and 48 and interlayer sheets 42 and 46 generally aligned. Clamps were used to conveniently retain the layers 40–48 in their desired positions. The arranged assembly 36 was then positioned between a pair of optically smooth flat pressing plates (each having a release agent, such as various organo polysiloxanes such as disclosed in U.S. Pat. No. 3,808,077 to Raymond G. Rieser and Joseph Chabal, the disclosure of which is incorporated herein by reference, on their pressing faces). The resulting sandwich was inserted within an air impervious bag of the type disclosed in U.S. Pat. No. 3,255,567 of Leroy D. Keslar and John S. Rankin the disclosure of which is incorporated hereby reference. The bag was evacuated with at least about 24 inches (61 centimeters) of mercury and sealed around the sandwich to withdraw gases from the interfacial surfaces between the lites and interlayer sheets 40, 42, 44, 46 and 48. After evacuation, the bag and its contents were inserted within an air autoclave. The pressure in the autoclave was increased at a relatively rapid rate while the temperature was raised at a slower rate until the assembly was exposed to approximately a 315° F. (157° C.) temperature and 200 pounds per square inch (14 kilograms per square centimeter) pressure condition, which was kept for approximately 45 minutes to bond the lites and interlayer sheets 40–48 into a unit. The autoclave was preferably cooled to approximately 100° F. (38° C.) before reducing the elevated pressure.

After the bonding was completed, the bag was removed and the flat laminated assembly 36 that resulted was generally horizontally supported and a protective layer 50 was formed on the lite 40 by casting and curing a quantity of Sylgard 184 silicone resin to the exposed surface thereof within a peripherally extending arm. The protective layer 50 was cured for 1½ to 2 hours at a temperature approximating 150° F. (66° C.). The protective layer can remain in place as long as it is not disturbed; yet, it can be readily stripped when its removal is desired.

The flat assembly 36 was next supported upon the female support ring 30, as shown in FIG. 5, and the shaping apparatus 20 was introduced into the air autoclave 22 at room temperature and pressure. The male form 32 was lowered against the central portion of the laminate assembly 36 to preliminarily shape the marginal edges of the flat laminated assembly 36 to the contour of the female support ring 30 to form a preliminarily shaped assembly, as shown in FIG. 6. The marginal edges of the preliminarily shaped assembly 36 were clamped to the female support ring 30 using clamps 70 as shown in FIG. 7, to retain the conformity of shape with ring 30. The autoclave 22 was closed and the male form 32 was raised out of engagement with the clamped assembly 36, as shown in FIG. 8.

The air autoclave 22 was next pressurized quickly and heated more slowly to approximately 315° F. (157° C.) temperature and 200 pounds per square inch (14 kilograms per square centimeter) pressure and held for approximately 45 minutes to thoroughly and uniformly heat saturate the preliminarily shaped and clamped assembly 36. The male form 32 was then lowered again, this time, as shown in FIG. 9, to a level below that of the female support ring 30 to engage and impress its predetermined contour upon the central portion of the heated and clamped assembly 36. The autoclave 22 was then cooled to below 100° F. (38° C.) while the autoclave pressure and the engagement of the male form 32 was maintained. The autoclave pressure was then reduced while the engagement of the male form 32 was maintained. Thereafter, the autoclave was opened and the male form 32 released from engagement with the finally shaped and laminated assembly 36, as shown in FIG. 10. The finally shaped and laminated assembly 36 was trimmed to a desired outline configuration by cutting the excess marginal portion from the remainder of the shaped and laminated assembly. The protective layer 50 was kept in place on lite 40 until such time as further fabrication to a resulting shaped laminated window containing attachment hardware required its removal.

A shaped laminated window produced by the method of EXAMPLE I was installed in a test frame simulating an aircraft installation. The window successfully defeated an impact test performed by shooting a bird weighing 4 pounds 1.1 ounces (1.82 kilograms) at 499 knots against the installed window.

The form of the invention shown and described in this disclosure represents an illustrative preferred embodiment and a modification thereof. It is understood that various changes may be made without departing from the gist of this invention as defined by the claimed subject matter that follows.

What is claimed is:

1. A method of forming a transparent laminate having a desired compound or complicated configuration, comprising the steps of:

supporting a plurality of relatively flat, rigid, transparent lites and soft interlayer sheets in an overlying relation one to another to form a flat assembly, having a plurality of interfacial surfaces;

removing gases from the interfacial surfaces between said overlying lites and sheets;

laminating said evacuated overlying flat lites and sheets together to form an assembly having a deformation temperature;

positioning marginal edge portions of the flat assembly in facing relation to portions of a supporting surface of a non-planar female skeleton ring;

biasing the assembly at a first temperature below the deformation temperature of the assembly toward the supporting surface of the female skeleton ring to conform the marginal edge portions of a first major surface of the assembly to the supporting surface of the female skeleton ring to convert said flat assembly into a preliminarily shaped assembly;

heating the preliminarily shaped assembly to a second temperature at least equal to the deformation temperature of the assembly; while exposing the assembly to superatmospheric pressure sufficient to prevent outgassing from the sheets; and urging a male form having a shaping surface of desired configuration toward a central portion of the second and opposite major surface of the assembly to impress the shaping surface configuration of the male form on the central portion of the assembly during said heating and elevated pressure exposing steps, thereby converting said preliminarily shaped assembly to a transparent laminate having said desired compound or complicated configuration.

2. The method as in claim 1, comprising performing said laminating step before performing said heating and exposing steps.

3. The method as in claim 1 comprising performing said laminating step while performing said heating and exposing step.

4. The method as in claim 1 further comprising:
cooling the assembly to a temperature below the deformation temperature of the assembly while continuing to urge said male form toward said central portion to retain said shaping surface configuration on said central portion.

5. The method as in claim 4, further comprising:
trimming marginal edge portions from the assembly after cooling the latter to provide a transparent laminate having a desired outline and configuration.

6. The method as in claim 1 or 5, including clamping said preliminarily shaped assembly against said nonplanar female skeleton ring after said biasing step changes the shape of the assembly from a relatively flat configuration to said preliminarily shaped configuration.

7. The method as in claim 6 wherein the desired configuration is complicated comprising urging a male form having a shaping surface conforming essentially to said compound or complicated configuration toward said preliminarily shaped assembly.

8. The method as in claim 6, further comprising:
providing a surface-protecting layer on the second and opposite major surface of the assembly prior to performing said urging step.

9. The method as in claim 7, comprising performing said heating, exposing and urging steps in a closed autoclave.

10. The method as in claim 9 comprising separating the male form from the preliminarily shaped assembly prior to said steps of heating and exposing said preliminarily shaped assembly to elevated pressure in said autoclave.

11. The method as in claim 9, comprising performing said biasing step in a chamber.

12. The method as in claim 11, wherein said chamber is the autoclave where said heating, exposing and urging steps are performed.

* * * * *